United States Patent [19]

Slindee

[11] Patent Number: 4,573,349

[45] Date of Patent: Mar. 4, 1986

[54] NEEDLE POSITION INDICATOR FOR A FUEL INJECTION NOZZLE HOLDER

[75] Inventor: Edward A. Slindee, Elmhurst, Ill.

[73] Assignee: International Harvester Company, Chicago, Ill.

[21] Appl. No.: 625,489

[22] Filed: Jun. 28, 1984

[51] Int. Cl.[4] .......................................... G01M 15/00
[52] U.S. Cl. .................................................. 73/119 A
[58] Field of Search ........................ 73/119 A, 119 R

[56] References Cited

U.S. PATENT DOCUMENTS

| 4,356,979 | 11/1982 | Dobler | 73/119 A |
| 4,359,895 | 11/1982 | Wolff | 73/119 A |
| 4,366,706 | 1/1983 | Wolff | 73/119 A |
| 4,397,180 | 8/1983 | Wolff | 73/119 A |
| 4,398,670 | 8/1983 | Hofmann | 239/533.9 |
| 4,502,326 | 3/1985 | Kalzynski | 73/119 A |

FOREIGN PATENT DOCUMENTS 522651 4/1955 Italy .................................. 73/119 A Primary Examiner—Stewart J. Levy
Assistant Examiner—Robert R. Raevis
Attorney, Agent, or Firm—Dennis K. Sullivan; F. David Au Buchon

[57] ABSTRACT

An improved needle position indicator for a fuel injection nozzle holder is provided by the present invention. The present invention is an apparatus for centering the position indicator mounting bracket within the interior chamber of the nozzle holder. The mounting bracket is centered by a resilient ring which surrounds the mounting bracket. By use of the present invention, manufacturing tolerances of the nozzle holder, mounting bracket, and seat spring may be relaxed while at the same time maintaining optimum levels of performance of the needle position indicator.

11 Claims, 4 Drawing Figures

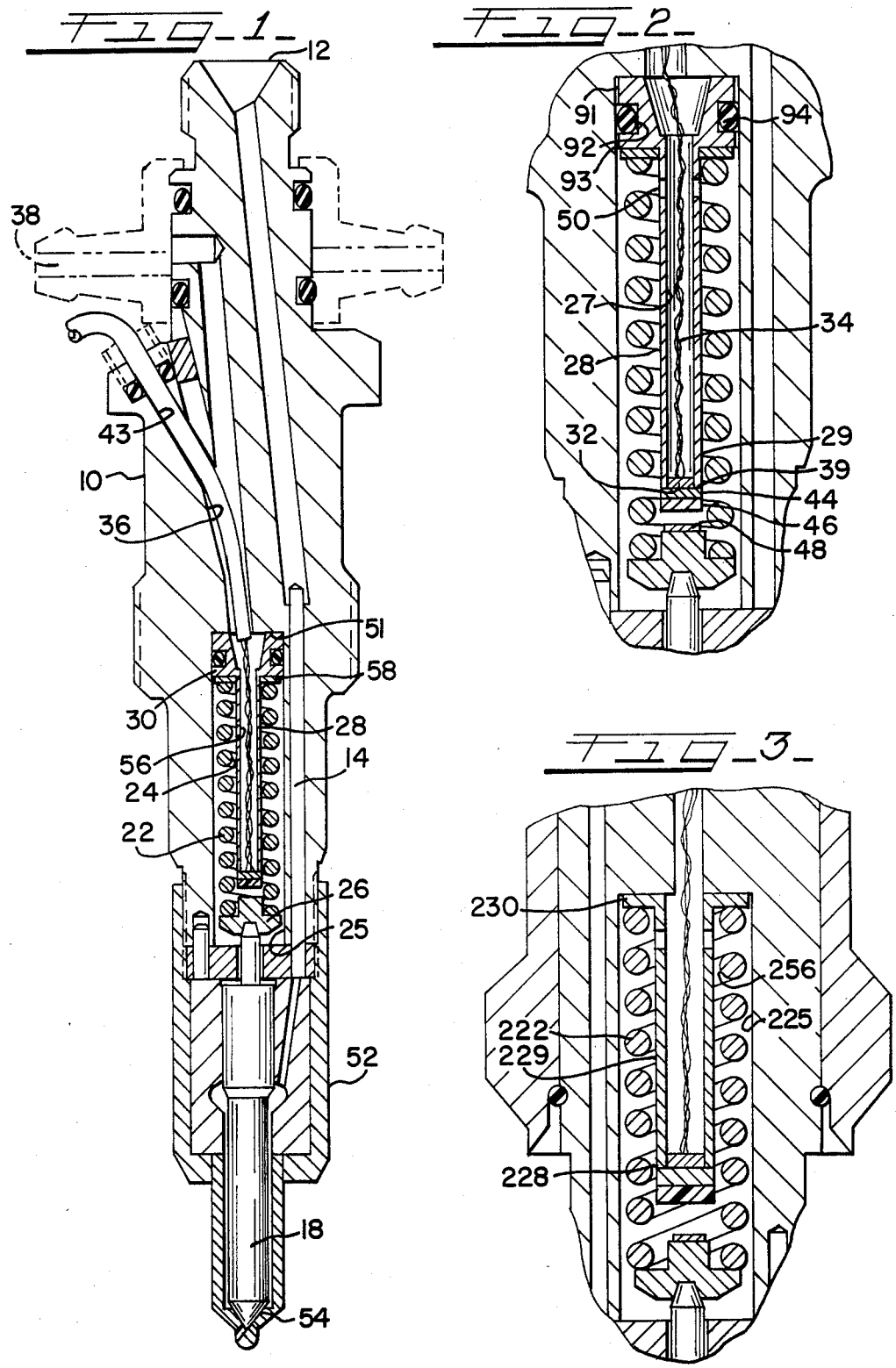

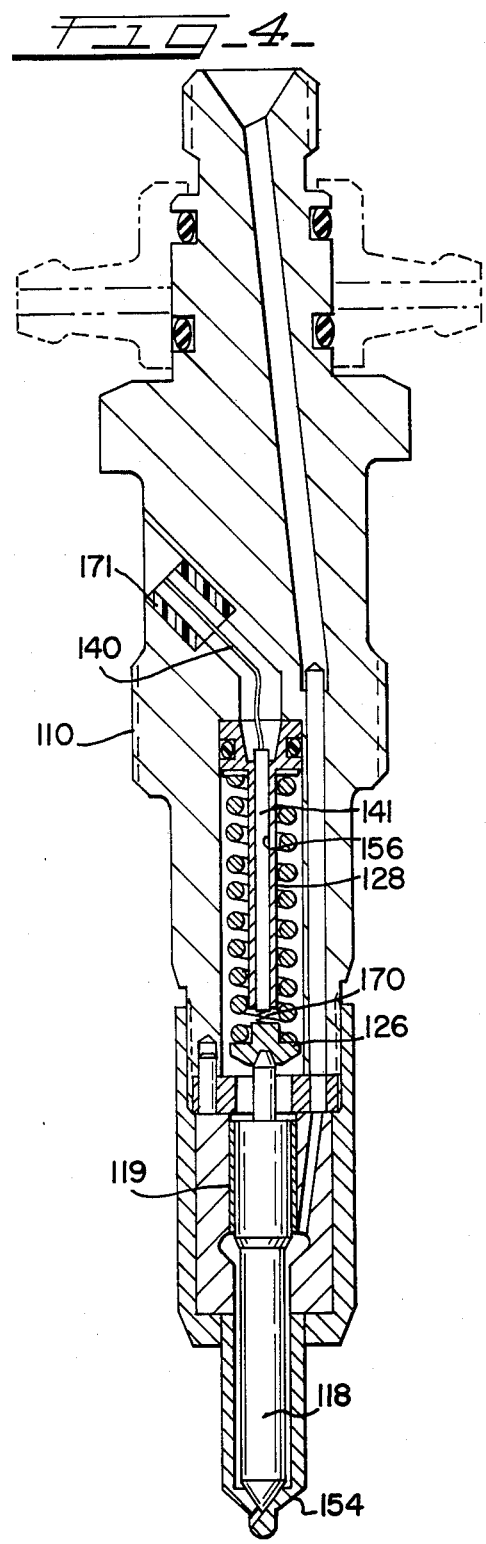
FIG_4

NEEDLE POSITION INDICATOR FOR A FUEL INJECTION NOZZLE HOLDER

BACKGROUND OF THE INVENTION

This present invention pertains to needle position indicators for fuel injection nozzle holders. More particularly, the present invention pertains to an improved method of centering the sensor holder, commonly referred to as the mounting bracket, in a needle position sensing system, for a fuel injector nozzle holder. Examples of needle position indicators for fuel injector nozzle holders which may utilize the present invention are disclosed in Wolff et al. U.S. Pat. No. 4,359,895, Wolff U.S. Pat. No. 4,366,706 and Hofmann U.S. Pat. No. 4,398,670, and the disclosures of these three patents are referenced herein. Needle position indicators are used as an aid in the electronic controlled timing of fuel injected engines such as diesels.

DISCLOSURE STATEMENT

Fuel injector valves with needle position indicators usually have at least five basic elements. The first element is the valve body, commonly referred to as the injector nozzle holder. The nozzle holder has an inlet port and an outlet port for delivery of fuel to the cylinder combustion chamber. The second element of the injector valve is a needle, which is mounted within an internal chamber of the nozzle holder. The needle is positioned against a valve seat so that it may selectively interrupt the flow of fuel delivered to the combustion chamber.

Biasing the needle to a predetermined position is the third element, the biasing spring. The biasing spring is usually a cylindrical coil spring and usually acts to bias the needle to close off the valve seat of the nozzle holder body. The fourth element is the mounting bracket which is mounted within the chamber, surrounded by the biasing spring. The fifth element is the means for sensing the displacement of the needle from the valve seat. The sensing means is held within the chamber by the mounting bracket. The sensing means may use magnetic impulses or may rely upon eletrical indicia to indicate dislocation of the valve needle from the valve seat. In some applications, displacement as well as dislocation of the valve needle is monitored.

The mounting bracket, commonly referred to sensor holder has a flange portion located at its axial end opposite the needle. The spring acts to push the mounting bracket away from the needle. To prevent destruction of the sensor and the mounting bracket the spring is generally retained out of contact with most of the axial length of the bracket holder. To prevent the spring from making contact with the mounting bracket during engine operation, dimensional tolerances of the inner diameter of the spring, outer diameter of the mounting bracket, and the inner diameter of the chamber must be kept to very stringent levels. The dimensional tolerances on concentricity between the sensor holder, spring and chamber must also be held to stringent levels.

SUMMARY OF THE INVENTION

The present invention improves the structure of the needle position indicator by adding a resilient member around the periphery of the mounting bracket. This resilient member acts to radially center the mounting bracket in relationship to the spring and the chamber. The centering action of the resilient member allows less stringent tolerances to be used in manufacture of the needle position indicators, thereby reducing cost.

A desire of the present invention is to provide an improved needle position indicator for a fuel injector nozzle holder. It is an object of the present invention to provide a needle position indicator for a fuel injector nozzle holder which can be manufactured from machine parts with less stringent dimensional tolerances. It is a desire of the present invention to provide an apparatus which lowers the requirement for dimensional concentricity of the mounting bracket in respect to the axial center of the spring. It is another desire of the present invention to provide an improved apparatus which reduces or eliminates wear caused by the spring making contact with the axial length of the mounting bracket. It is still another desire of the present invention to provide a needle position indicator for a fuel injector nozzle holder which can be utlized over longer periods of engine operation. Other objects and desires of the present invention will become apparent to those skilled in the art, as the nature of the invention is better understood from the accompanying drawings and detailed description.

BRIEF DESCRIPTION OF THE DRAWINGS

FIG. 1 is a partially cut away section view of a fuel injector nozzle holder including a needle position indicator according to the present invention;

FIG. 2 is an enlarged view of the chamber of a needle position indicator in light of the present invention;

FIG. 3 is an enlarged partial view of the chamber of a needle position indicator prior to the present invention; and FIG. 4 is a partially cut away sectional view of another embodiment of a fuel injection nozzle holder including the present invention.

DETAILED DESCRIPTION OF THE INVENTION

FIG. 1 illustrates a commonly used fuel injector nozzle holder 10. A high pressure fuel line is coupled to the fuel intake port 12 of the nozzle holder 10. Pressurized fuel is fed through the passage 14 to the lower section of the nozzle holder 52. Within the lower section of nozzle holder 52 is valve seat 54. Slideably mounted within the chamber 25 and capable of axial movement therein is needle 18. Needle 18 is biased to a predetermined position by cylindrical coil spring 22. In the embodiment illustrated in FIG. 1 needle 18 is biased to a close position and is provided with a spring seat 26 to aid in engagement with the spring 22. Spring seat 26 moves in synchronization with needle 18.

The mounting bracket 28 is mounted within the chamber 25 and within the spring cylindrical or axial bore 24. The mounting bracket 28 has a bore 27 for insertion of a sensor and a flange 30 to provide a point of reaction with the spring 22. The embodiment of FIG. 1 additionally has a shim 58 captured between the flange 30 and the spring 22 to adjust nozzle opening pressure. The upper biasing force exerted by the spring 22 against the flange 30, serves to maintain the mounting bracket 28 in a fixed position within the spring axial bore 24.

In the embodiment illustrated in FIGS. 1 and 2 a magnetic type sensor is used. A three lead header 32 is coupled to the lower portion 39 of the mounting bracket. Electrical leads 34 are routed upward through the body of the mounting bracket 28 and pass through the passage 36 of the nozzle holder. Passage 36 also forms a fuel leakage path by connecting the interior of the chamber 25 through the hole(s) 50 in mounting bracket 28 to the fuel discharge port 38. A side passage 43 is machined into the nozzle holder 10 to allow the electrical leads or cable 34 to exit to the outside or to be inserted from the outside.

A Hall Effect sensor 44 is coupled to the lower surface of header 32. A layer of epoxy encapsulation 46 surrounds the lower exposed surface of sensor 44. The interior body or axial bore of mounting bracket 28 is typically filled with a potting compound, such as epoxy material (not shown), to mechanically secure electrical leads 34.

A permanent magnet 48 is secured to the top surface of the spring seat 26. Magnet 48 is fabricated in a size which permits it to be positioned on the upper cylindrical surface of spring holder 26 without extending beyond the perimeter of this device. When needle 18 is displaced the magnet flux in the vicinity of the Hall Effect sensor 44 is instantly changed, causing the output voltage of this device to vary according to the displacement of needle 18. The above change in output voltage is transmitted by leads 34 to an electrical receptacle or at another location outside of the nozzle holder. The receptacle gives the indicia of movement.

In other embodiments (not shown) the permanent magnet 48 may be coupled to the upper surface of header 32 and the sensor may sense magnetic flux density changes caused by the movement of the spring seat 26 which is usually fabricated from a ferromagnetic material. In still other embodiments of the present invention the sensor may be molded onto a four-wire cable, protected by metal shielding and a Teflon cover within the holder. It is apparent to those skilled in the art how various modifications may be made in these types of sensors while still utilizing the principle of activation by changes in magnetic flux.

FIG. 4 illustrates an embodiment of the present invention with an electrical sensing means in lieu of the magnetic sensor. Needle 118 is electrically isolated from the nozzle holder body 110 by the electrical insulating sleeve 119. Only when the needle 118 makes contact with the valve seat 154, is the needle 118 in electrical contact with nozzle holder body 110.

Mounting bracket 128 has an axial bore 156 and is open at its end towards spring seat 126. Inserted within the mounting bracket axial bore 156 is the connecting pin 141. Connecting pin 141 is electrically isolated from nozzle body 110 by allowing the mounting bracket 128 to be manufactured from electrically non-conducting material or by electrically isolating the mounting bracket 128 from the nozzle holder body 110. Connecting pin 141 is electrically connected with the needle 118 through the connector spring 170 and the spring seat 126. Connecting pin 141 is also electrically connected with the cable 140. Cable 140 is held out of electrical contact with the nozzle holder body 110 by the insulator 171 and is coupled to a receptacle (not shown).

From the receptacle an electrical contact is made with nozzle holder body 110. As one skilled in the art can determine, the electrical circuit is complete when the needle 118 makes contact with the valve seat 154. Therefore, dislocation of needle 118 from valve seat 154, may be monitored by monitoring the frequency of the electrical circuit.

FIG. 3 is an enlarged view of the needle valve sensor mounting bracket prior to the present invention. To prevent wear and ultimate distruction of the sensor, the spring 222 must be prevented from rubbing along the sides 229 of the mounting bracket. The first critical dimension is the diameter of the chamber 225. The second critical dimension is the interior or axial diameter of spring 222. The third critical dimension is the outside diameter of mounting bracket 228 along the side 229. Other critical dimensions are concentricity between chamber 225, spring axial bore 256 and mounting bracket side 229. Also, during assembly the mounting bracket 228 must slide into the chamber 225. Therefore the diameter of flange 230 cannot have interference with the inner diameter of the chamber 225, however, the diameter of flange 230 must be as close as practically possible to the inner diameter of the chamber 225 to provide proper centering.

The mounting bracket of the present invention is not centered by the flange but instead is centered by a resilient ring which surrounds the mounting bracket.

The resilient ring or O-ring deforms to irregularities in the diameter of the chamber, or to the outside diameter of the mounting bracket. Although the present invention may be utilized with the resilient ring mounting encircling other portions of the mounting bracket, in most situations it will be preferred to encircle flange 30 as illusrated in FIGS. 1 and 2. The mounting bracket 28 of the invention is provided with a flange 30 with three outside diameters, first outside diameter 91, second outside diameter 92, and third outside diameter 93. Second outside diameter 92 is less than first outside diameter 91 or third outside diameter 93. O-ring 94 is captured in the groove formed between the first outside diameter 91 and the third outside diameter 93. With utilization of the mounting bracket of the present invention tolerances of the diameter and axial straightness of the chamber 25 may be relaxed from previous stringent requirements. Also, tolerances on spring axial bore 56 may be relaxed from previous required standards. Machining tolerances on the outside diameter of the mounting bracket may also be relaxed from those previously mandated. Last but not least, the tight fit between the flange 30 and the chamber 25 can be eliminated.

Although the present invention has been mainly described in embodiments of sensors utilizing resistance circuits, or Hall Effect, it is apparent to those skilled in the art that the present invention may be used with reluctance type sensors. It will also be readily apparent to those skilled in the art of other various modifications which can be made to the present invention without departing from the spirit or scope of this application as encompassed by the following claims.

What is claimed is:
1. A needle position indicator for a fuel injector nozzle holder comprising:
   a nozzle holder body, said body having an internal chamber and a valve seat;
   a needle mounted within said chamber adapted to make sealing contact with said valve seat;
   spring biasing means for biasing said needle to a predetermined position in relation with said valve seat;
   means for sensing the dislocation of said needle from said valve seat;
   sensing means mounting bracket, mounted within said chamber surrounded by said spring; and a resilient ring, surrounding said mounting bracket, radially centering said bracket within said chamber.

2. A needle position indicator as described in claim 1, wherein said sensing is by electrical means.

3. A needle position indicator apparatus as described in claim 2, wherein said sensing is by magnetic means.

4. A needle position indicator as described in claim 3, wherein said magnetic sensing means senses the Hall Effect.

5. A needle position indicator as described in claim 3, wherein said magnetic sensing means senses the reluctance.

6. An apparatus as recited in claim 3, wherein said spring biases said needle against said seat in said predetermined position and wherein there is at the end of said mounting bracket towards said needle a magnetic sensing means for sensing changes in the strength of the magnetic field caused by relative displacement between said needle and said needle seat.

7. An apparatus as recited in claim 6, wherein said mounting bracket has a first outside diameter, a second outside diameter, third outside diameter, and wherein said second outside diameter is less than said first or third diameters and wherein said resilient ring is an O-ring captured between said first and third diameters.

8. An apparatus as recited in claim 6, wherein said sensing means may be inserted into said mounting bracket through a passageway through said nozzle holder from a location external to said nozzle holder.

9. An apparatus as recited in claim 2, wherein said needle is electrically insulated from said nozzle holder body except wherein said needle contacts said valve seat and wherein said needle position indicator also includes an electrical connection means connecting the needle valve to an external terminal, said electrical connection means being electrically isolated from said nozzle holder body.

10. A needle position indicator for a fuel injector nozzle holder which comprises:
- a nozzle holder body, said body having an internal chamber with upper and lower ends, and said body having a valve seat;
- a needle mounted within said chamber adapted to make sealing contact with said valve seat, said needle having an upper and lower end;
- a spring having a central passageway, said spring positioned within said chamber for exerting a force against the upper end of said chamber and against the upper end of the needle to bias the needle against the needle seat;
- means positioned within said chamber for generating a magnetic field within said chamber;
- a mounting bracket having a body extending through the central passageway of said spring, said bracket having a lower end adjacent to and in alignment with the upper end of said needle;
- means mounted on the lower end of said bracket for sensing changes in the strength of the magnetic field caused by relative displacements between the needle and the needle seat; and
- a resilient ring, surrounding said mounting bracket, radially centering said bracket within said chamber.

11. An apparatus as recited in claim 1, wherein said mounting bracket has a first outside diameter, a second outside diameter, a third outside diameter, and wherein said second outside diameter is less than said first or third diameters and wherein said resilient ring is an O-ring captured between said first and third diameters.

* * * * *